Feb. 8, 1949.   N. IVANOVIC   2,460,829
VIBRATION INSULATING DEVICE
Filed Aug. 1, 1945

*INVENTOR.*
NICHOLAS IVANOVIC.
BY
Ralph L Chappell
ATTORNEY

Patented Feb. 8, 1949

2,460,829

UNITED STATES PATENT OFFICE 2,460,829

VIBRATION INSULATING DEVICE

Nicholas Ivanovic, Philadelphia, Pa.

Application August 1, 1945, Serial No. 608,332

9 Claims. (Cl. 248—358)

(Granted under the act of March 3, 1883, as amended April 30, 1928; 370 O. G. 757)

This invention relates to new and useful improvements in vibration insulating structures and more particularly to vibration insulators especially adapted for use in environments wherein substantial vibration occurs.

In many instances it is desirable or necessary to shockmount or vibrationally insulate from their supporting structures, various types of instruments, radio equipment, engines, motors and numerous other devices and, with this in mind, it is the principal object of the present invention to provide a novel vibration insulator mounting that is operable to provide substantially uniform vibration insulation in all directions.

Another object of the invention is to provide a novel vibration insulator as set forth wherein the deflection and spring rate of the insulator may be controlled as desired.

Another object of the invention is to provide a novel vibration insulator of the stated character which may be mounted in any plane or position without affecting operation thereof, and which is further characterized by rotational freedom where desired.

A further object of the invention is to provide a novel vibration insulator of the type described which may be readily adapted to both high and low static load conditions.

Still a further object of the invention is to provide a novel vibration insulator having the features and characteristics set forth which is operable to provide superior vibration insulation characteristics in installations where the amplitude of the vibration impulse is of large magnitude.

A still further object of the present invention is to provide a vibration insulator as set forth which is of relatively simplified and rugged construction, comparatively inexpensive to manufacture and highly efficient in use and operation.

These and other objects of the invention, and the various features and details of the construction, operation and use thereof, are hereinafter fully set forth and described with reference to the accompanying drawing, in which.

Figure 1:
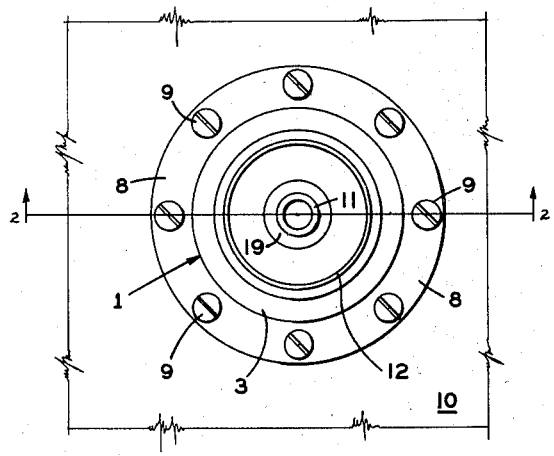
Fig. 1 is a view in plan of a vibration insulator embodying the present invention.
Figure 2:
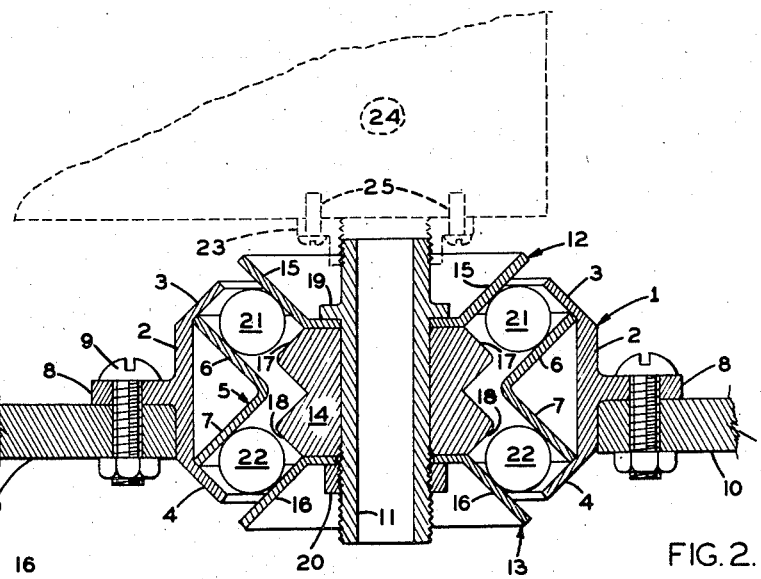
Fig. 2 is an enlarged sectional view taken on line 2—2, Fig. 1.

Referring now to the drawing, and more particularly to Figs. 1 and 2 thereof, a vibration insulator made according to the present invention may comprise a fixed supporting structure including an outer ring or annular support 1 having a straight-sided portion 2 and upper and lower edge portions 3 and 4, respectively, which extend angularly inward from the portion 2, for example, at an angle of 45°, an inner annular load supporting member 5 which is of substantially conical cross-section shape as shown, having wall portions 6 and 7, respectively, disposed, for example, at an angle of 45° to the straight sided portion 2 of said support 1 and substantially perpendicular to the angularly disposed edge portions 3 and 4 thereof. In the illustrated embodiment of the invention, the annular support 1 is provided with an integral flange portion 8 that projects laterally outward from the straight-sided portion 2 thereof, and is provided with a series of openings for the reception of bolts, screws or other suitable fasteners 9 by means of which the supporting structure may be fixedly secured or anchored to a part 10 of a structure with respect to which an article is to be mounted and vibrationally insulated.

Disposed substantially coaxially within the annular support 1 and its associated load member 5 is a floating support assembly comprising a tube 11 on which are mounted upper and lower load support members 12 and 13 intermediate which there is preferably disposed a member 14. The support members 12 and 13 are of generally conical cross section shape and are positioned upon the tube 11 so that their angularly disposed walls 15 and 16, respectively, flare outwardly in opposite directions endwise of the said tube 11 as shown in Fig. 2 of the drawing. The member 14 disposed intermediate the support members 12 and 13, preferably is composed of a relatively resilient material such as, for example, rubber or the like, and has its external surface shaped or configurated as shown in said Fig. 2 to provide angularly disposed surfaces 17 and 18, respectively, which extend substantially perpendicular to the walls 15 and 16 of the supports 12 and 13, and substantially parallel to the angular edge portions 3 and 4 of the annular fixed support 1. The upper and lower support members 12 and 13, and the intermediate member 14, are secured in the described relation lengthwise upon the tube 11, against a shoulder 19 provided adjacent one end thereof, by means of a nut or like retaining element 20 which may be threaded on the other end of said tube 11.

The entire floating support assembly, comprising the tube 11, supports 12 and 13 and the member 14, is resiliently supported with respect to the fixed support structure, comprising the support members 5, by means of series of spherical elements 21 and 22 composed, for example, of rubber or the like and disposed, respectively, between the wall 6 of the member 5 and the wall 15 of the support 12, and between the wall 7 of said member 5 and the wall 16 of the support 13 as shown, the angularly disposed edge portions 3 and 4 of the support 1, and the surface portions 17 and 18 of the cushion member 14 functioning as abutments to retain said spherical elements 21 and 22 against displacement from cooperative engagement between the respective walls mentioned.

A piece of equipment adapted to be vibrationally insulated, for example, from the structure or part 10, may be connected or anchored in any suitable manner to the tube 11 of the support assembly. Thus, for example there may be threaded upon the upper end of the tube 11 an annular flange member 23 to which a piece of equipment 24 may be fastened by screws or other suitable fastener 25.

Vibration insulators constructed as herein described and embodying series of resilient spherical elements cooperable between surfaces which are angularly disposed with respect to the axis of support of the insulator, provide a number of features that are unique in vibration insulation. Thus, a relative depression of the floating support assembly or structure relative to the fixed support structure produces three effects, to wit, a compression of the upper series of the resilient spherical elements 21 with accompanying energy absorption, a release of the compression upon the lower series of resilient spherical elements 22 and a relative rolling interaction between the series of spherical elements 21 and 22 and the associated angularly disposed surfaces which results in movement of the spherical elements 21 and 22 in a downward direction with respect to the surfaces of the fixed load member 5 of the fixed support structure.

Such downward movement of spherical elements is a distinct aid to vibration insulation since the total excursion or movement of the floating support structure with respect to the fixed support structure is the sum of two movements produced by compression of the series of spherical elements and by the downward travel of these elements with respect to the angular surfaces associated with the fixed supporting structure. This downward movement is variable and may be controlled easily and readily as desired by varying the durometer hardness of the spherical elements, the size of said spherical elements, the number of spherical elements, the slope of the angularly disposed surfaces cooperatively associated with said spherical elements, and the initial or static compression force exerted on the spherical elements 21 and 22 effected by tightening or loosening the nut 20 upon the tube 11 to the desired extent. It is known that a resilient element such as the elements 21 and 22 is characterized by a variable spring constant, and hence by changing one or more of the variables just mentioned it is possible to adjust the vibration characteristics of the present invention over a relatively wide range of spring constants varying from "soft" to "hard." This is an important feature in that in critical applications the vibration insulator may be adjusted to meet any given specific service conditions. Furthermore, the deflection (or compression) of the elements 21 and 22 is not a linear function of the load thereon, and the effect of the intercooperation between the resilient spherical elements and the angular disposed surfaces is to lengthen the load/deflection curve, thereby increasing the total movement of the floating support member with a resulting "softening" of the vibration insulator.

Vibration insulators made in accordance with the present invention also embodying unique characteristics of vibration insulation insofar as direction of load or vibration impulse is concerned. Thus with respect to any load acting axially of the tube 11 of the floating support assembly the vibration insulating characteristics of the insulator will be the same so long as the number of resilient elements, their size and hardness remain constant, and since two series of spherical elements are provided to absorb the applied load, the vibration insulating qualities of the present insulator are equally effective against loads applied in a direction normal to the axis of the tube 11 or angularly with respect thereto. The construction and arrangement of vibration insulators according to the present invention also permits of axial rotation of the floating support structure or assembly relative to the fixed support structure, and this characteristic or feature may be utilized to advantage to provide vibration insulating supports for rotating elements such as shaft, rods, spindles and the like. Furthermore, vibration insulators made according to the present invention are self-snubbing. This will be apparent by reason of the inherent load/deflation characteristics of the resilient spherical elements which are capable of being placed in compression only. Thus, upon excessive excursions of the floating assembly in both up and down directions, a snubbing action will automatically take place.

Figure 3:
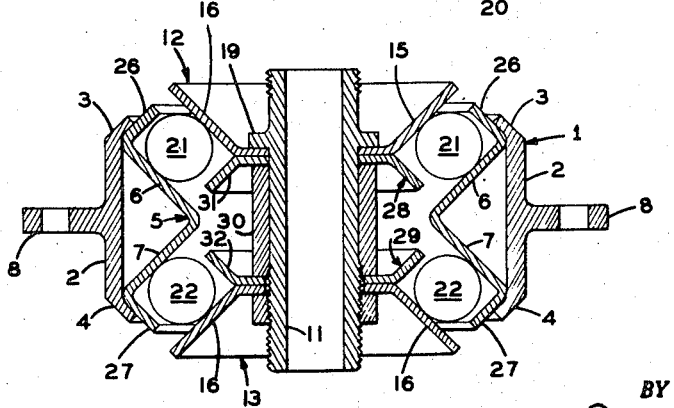
Fig. 3 is a view similar to Fig. 2 showing a modified construction and arrangement of the insulator.

Another form of vibration insulator embodying the present invention is shown in Fig. 3 of the drawing. The construction there shown is generally similar to the insulator shown in Figs. 1 and 2 except for certain differences in detail. Thus, in the device shown in Fig. 3 the angular edge portions 3 and 4 of the fixed support 1 are relatively short and the spherical elements are retained intermediate the walls 15 and 16 of the floating load members 12 and 13, and the walls 6 and 7 of the support member 5, by means of angularly disposed edge portions 26 and 27, respectively, which are provided upon the fixed load member 5 and extend substantially parallel to the support edge portions 3 and 4 as shown. In addition, the member 14 in the device of Fig. 2 may be eliminated in the insulator of Fig. 3 and replaced by stop members 28 and 29, respectively, preferably having therebetween an intermediate sleeve 30 of resilient material. The members 28 and 29 have angular edge portions 31 and 32, respectively, that are disposed substantially parallel to the angular edge portions 26 and 27 of the fixed load support member 5 just described, and which, with said edge portions, retain the spherical elements 21 and 22 cooperatively disposed with respect to the wall portions of the fixed and floating load support members 8, and 12 and 13, respectively. In this form of insulator, as in that shown in Fig. 2, the static compression or reaction of the floating load members 12 and 13 upon the spherical elements 21 and 22, may be varied and regulated as desired by adjustment of the nut 20 upon the tube 11. In all functional respects the insulator of Fig. 3 embodies the vibration insulation features and characteristics set forth and described with reference to the insulator shown in Figs. 1 and 2 of the drawing.

While the use of the intermediate resilient members 14 and 30 generally is preferred in the embodiments of the insulators shown in Figs. 2 and 3 of the drawing, respectively, it will be apparent that these members may be eliminated entirely, in which event the static or initial compression forces of the devices may be fixed by variation of the pressure exerted by the members 12 and 13 upon the spherical elements 21 and 22 through adjustment of the nuts 20 as previously described. Of course, in the case of the insulator structure shown in Fig. 2, elimination of the member 14 requires the provision of other surfaces to take the place of the surfaces 17 and 18 of the member 14 which operate to retain the spherical elements 21 and 22 between the surfaces 6, 15 and 7, 16. On the other hand, for a given installation of a vibration insulator of the present invention, wherein the vibration conditions and characteristics, together with the spring constant and deflection characteristics of the insulation structure, are known, the members 14 and 30 may be fabricated of non-resilient material and provided with an axial length that insures the required static compression force exerted by the floating support assembly upon the spherical elements 21 and 22 for such given installation.

From the foregoing description it will be observed that the present invention provides a novel vibration insulator that is operable to provide substantial uniform vibration insulation in all directions, and which is constructed and arranged to provide for the ready and easy controllability of the spring rate and deflection characteristics of the insulator. The invention also provides a novel vibration insulator which may be mounted in any plane or position without effecting the insulating characteristics thereof, which may be readily adapted to both high and low static load conditions and which is further characterized by the rotational freedom of the floating support member. Furthermore, the invention provides a novel vibration insulator which is operable to provide superior vibration insulation characteristics in installations where the amplitude of the vibration impulse is of large magnitude, and which is further characterized by its relatively simplified and rugged construction, comparatively low cost of manufacture, and high in efficiency in use and operation.

It will be apparent to those skilled in the art that in lieu of the use of spherical resilient elements 21 and 22, such elements may be made cylindrical or other shape to produce vibration insulation characteristics to satisfy the conditions encountered in any particular application or installation of the invention. Also, the particular flange mounting provided for the fixed supporting structure of the insulators may be eliminated, altered or other mounting means may be provided, as required to meet the conditions of each particular installation, it being understood that the mounting shown in the drawing is for purposes of illustration only. Apart from these particular adjuncts of the invention, while certain embodiments of the present invention have been illustrated and described herein, it is not intended that the invention be limited to such disclosures, and changes and modifications may be made therein and thereto within the scope of the claims.

The invention described herein may be manufactured and used by or for the Government of the United States of America for governmental purposes without the payment of any royalties thereon or therefor.

I claim:

1. A vibration insulator comprising an annular fixed support structure having interiorly thereof angularly disposed annular surfaces arranged at an acute angle with respect to one another, a floating support assembly disposed substantially coaxially within said annular fixed support structure and having angularly disposed annular surfaces respectively associated with said angularly disposed surfaces of the fixed support structure, and a plurality of resilient elements interposed between the respective angularly disposed surfaces of the fixed and floating supports to vibrationally insulate the floating support assembly from said fixed support structure.

2. A vibration insulator comprising an annular fixed support structure having interiorly thereof angularly disposed annular surfaces arranged at an acute angle with respect to one another, a floating support assembly disposed substantially coaxially within said annular fixed support structure and having angularly disposed annular surfaces respectively associated with said angularly disposed surfaces of the fixed support structure, a plurality of resilient elements interposed between the respective angularly disposed surfaces of the fixed and floating supports to vibrationally insulate the floating support assembly from said fixed support structure, and means operable to vary the spacing between the angular surfaces of the floating support assembly to vary the static compression exerted thereby on said resilient elements.

3. A vibration insulator comprising an annular fixed support structure having interiorly thereof angularly disposed annular surfaces arranged at an acute angle with respect to one another, a floating support assembly disposed substantially coaxially within said annular fixed support structure and having angularly disposed annular surfaces respectively associated with said angularly disposed surfaces of the fixed support structure, and a plurality of resilient elements interposed between the respective angularly disposed surfaces of the fixed and floating supports to vibrationally insulate the floating support assembly from said fixed support structure, said fixed and floating supports respectively including abutments to retain said resilient elements against displacement from cooperative engagement between the angularly disposed surfaces of the fixed and floating supports.

4. A vibration insulator comprising an annular fixed support structure having interiorly thereof angularly disposed annular surfaces arranged at an acute angle with respect to one another, a floating support assembly disposed substantially coaxially within said annular fixed support structure and having angularly disposed annular surfaces respectively associated with said angularly disposed surfaces of the fixed support structure, a plurality of resilient elements interposed between the respective angularly disposed surfaces of the fixed and floating supports to vibrationally insulate the floating support assembly from said fixed support structure, and means operable to vary the spacing between the angular surfaces of the floating support assembly to vary the static compression exerted thereby on said resilient elements, said fixed and floating supports respectively including abutments to retain said resilient elements against displacement from cooperative engagement between the angularly disposed surfaces of the fixed and floating supports.

5. A vibration insulator comprising an annular fixed support structure having interiorly thereof angularly disposed annular surfaces arranged at an acute angle with respect to one another, a floating support assembly disposed substantially coaxially within said annular fixed support structure and including members providing angularly disposed annular surfaces respectively associated in spaced relation with said angularly disposed surfaces of the fixed support structure, a plurality of resilient elements interposed between the respective angularly disposed surfaces of the fixed and floating supports to vibrationally insulate the floating support assembly from said fixed support structure, and resilient means on said floating support intermediate said members and tending to urge the same in respectively opposite directions.

6. A vibration insulator comprising an annular fixed support structure having interiorly thereof angularly disposed annular surfaces arranged at an acute angle with respect to one another, a floating support assembly disposed substantially coaxially within said annular fixed support structure and including members providing angularly disposed annular surfaces respectively associated in spaced relation with said angularly disposed surfaces of the fixed support structure, a plurality of resilient elements interposed between the respective angularly disposed surfaces of the fixed and floating supports to vibrationally insulate the floating support assembly from said fixed support structure, resilient means on said floating support intermediate said members and tending to urge the same in respectively opposite directions, and means to variably compress said resilient means to adjust the spacing of said members and vary the static compression exerted thereby on said resilient elements.

7. A vibration insulator comprising an annular fixed support structure having interiorly thereof angularly disposed annular surfaces arranged at an acute angle with respect to one another, a floating support assembly disposed substantially coaxially within said annular fixed support structure and including members providing angularly disposed annular surfaces respectively associated with said angularly disposed surfaces of the fixed support structure, a plurality of resilient elements interposed between the respective angularly disposed surfaces of the fixed and floating supports to vibrationally insulate the floating support assembly from said fixed support structure and resilient means on said floating support intermediate said members and tending to urge the same in respectively opposite directions, said fixed and floating supports respectively including abutments to retain said resilient elements against displacement from cooperative engagement between the angularly disposed surfaces of the fixed and floating supports.

8. A vibration insulator comprising an annular fixed support structure having interiorly thereof angularly disposed annular surfaces arranged to an acute angle with respect to one another, a floating support assembly disposed substantially coaxially within said annular fixed support structure and including members providing angularly disposed annular surfaces respectively associated in spaced relation with said angularly disposed surfaces of the fixed support structure, a plurality of resilient elements interposed between the respective angularly disposed surfaces of the fixed and floating supports to vibrationally insulate the floating support assembly from said fixed support structure, resilient means on said floating support intermediate said members and tending to urge the same in respectively opposite directions, and means to variably compress said resilient means to adjust the spacing of said members and vary the static compression exerted thereby on said resilient elements, said fixed and floating supports respectively including abutments to retain said resilient elements against displacement from cooperative engagement between the angularly disposed surfaces of the fixed and floating supports.

9. A vibration insulator comprising an annular fixed support structure having interiorly thereof angularly disposed annular surfaces arranged at an acute angle with respect to one another, a rotatable floating support assembly disposed substantially coaxially within said annular fixed support structure and having angularly disposed annular surfaces respectively associated with said angularly disposed surfaces of the fixed support structure, a plurality of rotatable, resilient elements interposed between the respective angularly disposed surfaces of the fixed and rotatable, floating support to vibrationally insulate the rotatable, floating support from said fixed support structure and to permit rotation of the floating support, and means operable to vary the spacing between the angular surfaces of the rotatable floating support assembly to vary the static compression exerted thereby on said rotatable resilient elements.

NICHOLAS IVANOVIC.

REFERENCES CITED

The following references are of record in the file of this patent:

UNITED STATES PATENTS

| Number | Name | Date |
| --- | --- | --- |
| 758,457 | Macfarlane | Apr. 26, 1904 |

FOREIGN PATENTS

| Number | Country | Date |
| --- | --- | --- |
| 407,788 | Great Britain | Mar. 29, 1934 |
| 466,354 | Great Britain | May 26, 1937 |
| 499,232 | Great Britain | Jan. 20, 1939 |
| 829,524 | France | June 29, 1938 |